(12) United States Patent
Ohta

(10) Patent No.: US 9,211,913 B2
(45) Date of Patent: Dec. 15, 2015

(54) STRUCTURE FOR FRONT SIDE FRAMES OF AUTOMOBILE

(75) Inventor: Yoshikatsu Ohta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 13/983,678

(22) PCT Filed: Jan. 27, 2012

(86) PCT No.: PCT/JP2012/051805
§ 371 (c)(1),
(2), (4) Date: Sep. 30, 2013

(87) PCT Pub. No.: WO2012/108282
PCT Pub. Date: Aug. 16, 2012

(65) Prior Publication Data
US 2014/0015280 A1    Jan. 16, 2014

(30) Foreign Application Priority Data

Feb. 9, 2011 (JP) ................................ 2011-026085
Feb. 14, 2011 (JP) ................................ 2011-028503

(51) Int. Cl.
*B62D 21/15* (2006.01)
*B62D 25/20* (2006.01)
(Continued)

(52) U.S. Cl.
CPC .............. *B62D 21/15* (2013.01); *B62D 21/152* (2013.01); *B62D 25/20* (2013.01); *B62D 29/007* (2013.01); *C21D 1/10* (2013.01); *C21D 9/085* (2013.01); *F16F 7/123* (2013.01); *C21D 9/0068* (2013.01)

(58) Field of Classification Search
CPC ...... B62D 21/152; B62D 21/155; B62D 21/15
USPC ................... 296/187.09, 203.02; 280/784
See application file for complete search history.

(56) References Cited

U.S. PATENT DOCUMENTS 3,827,712 A   8/1974   Suzuki et al.
4,424,986 A   1/1984   Mizuno et al.
(Continued)

FOREIGN PATENT DOCUMENTS

CN   201580438 U   9/2010
EP   1426270 A1    6/2004
(Continued)

OTHER PUBLICATIONS

Japanese Official Action dated Nov. 5, 2014 issued in the corresponding JP patent application No. 2012-556829.
(Continued)

*Primary Examiner* — Jason S Morrow
(74) *Attorney, Agent, or Firm* — Carrier Blackman & Associates, P.C.; William D. Blackman; Joseph P. Carrier

(57) ABSTRACT

A structure for front side frames of automobile is provided in which since, among first and second bent parts to the rear of a power unit mounting part of the front side frame formed from a tubular hollow member having a constant cross-section, a first weak part is provided in the vicinity of the rear-side second bent part, and a second weak part is provided in the vicinity of a third bent part, which is bent convexly outward in the vehicle width direction in the power unit mounting part, when an automobile is involved in a frontal collision, it becomes possible for the front side frame formed from the tubular hollow member and having high strength to bend via the first weak part and also via the second weak part, thereby enabling the impact absorption stroke to be increased and the effect in absorbing collision energy to be enhanced.

7 Claims, 17 Drawing Sheets

(51) Int. Cl.
   *B62D 29/00* (2006.01)
   *C21D 9/08* (2006.01)
   *F16F 7/12* (2006.01)
   *C21D 1/10* (2006.01)
   *C21D 9/00* (2006.01)

(56) References Cited

U.S. PATENT DOCUMENTS

| | | | |
|---|---|---|---|
| 6,203,098 | B1 | 3/2001 | Motozawa et al. |
| 6,736,448 | B2 | 5/2004 | Hanakawa et al. |
| 6,811,212 | B2 | 11/2004 | Kasuga |
| 6,824,204 | B2 | 11/2004 | Gabbianelli et al. |
| 7,887,123 | B2 | 2/2011 | Honji et al. |
| 8,316,683 | B2 | 11/2012 | Tomizawa et al. |
| 8,454,079 | B2 | 6/2013 | Yoshida et al. |
| 2002/0163226 | A1 | 11/2002 | Shibata |
| 2004/0066062 | A1* | 4/2004 | Awano et al. ............ 296/203.02 |
| 2004/0113464 | A1* | 6/2004 | Kasuga ........................ 296/205 |
| 2004/0145217 | A1* | 7/2004 | Hanyu ......................... 296/204 |
| 2005/0151394 | A1 | 7/2005 | Grueneklee et al. |
| 2010/0117403 | A1* | 5/2010 | Kihara et al. ............ 296/203.02 |
| 2011/0285176 | A1* | 11/2011 | Baccouche et al. ........... 296/204 |
| 2012/0187719 | A1 | 7/2012 | Fujii et al. |
| 2013/0257028 | A1* | 10/2013 | Kuwabara et al. ........... 280/784 |
| 2014/0084634 | A1 | 3/2014 | Suzuki et al. |
| 2014/0239671 | A1* | 8/2014 | Mori ....................... 296/187.09 |
| 2014/0252739 | A1* | 9/2014 | Otani et al. ............ 280/124.109 |
| 2015/0021115 | A1* | 1/2015 | Komiya ....................... 180/312 |

FOREIGN PATENT DOCUMENTS

| | | |
|---|---|---|
| EP | 1363826 B1 | 1/2006 |
| EP | 2070805 A1 | 6/2009 |
| EP | 2143621 A1 | 1/2010 |
| EP | 2671778 A1 | 12/2013 |
| JP | 133323/1974 | 11/1974 |
| JP | 47480/1982 | 3/1982 |
| JP | 64-067482 A | 3/1989 |
| JP | 09-86438 A | 3/1997 |
| JP | 2000-233765 A | 8/2000 |
| JP | 2001188998 A | 7/2001 |
| JP | 2003-95132 A | 4/2003 |
| JP | 2004-083931 A | 3/2004 |
| JP | 2004-188998 A | 7/2004 |
| JP | 2004-352092 A | 12/2004 |
| JP | 2005225253 A | 8/2005 |
| JP | 2007045261 A | 2/2007 |
| JP | 2007-112212 A | 5/2007 |
| JP | 2008-105517 A | 5/2008 |
| JP | 2010000873 A | 1/2010 |
| WO | 2008020143 A1 | 2/2008 |
| WO | 2008/123505 A1 | 10/2008 |
| WO | 2008/123506 A1 | 10/2008 |

OTHER PUBLICATIONS

Official Communication dated Feb. 28, 2015 issued in the corresponding Chinese Application No. 201280006270.2.
Official Communications dated Feb. 26, 2015 corresponding with European Patent Application EP 12 74 4661.
Official Communication dated Jun. 12, 2015 in regards to European Patent Application No. EP 12 74 4661.

* cited by examiner

FIG.5
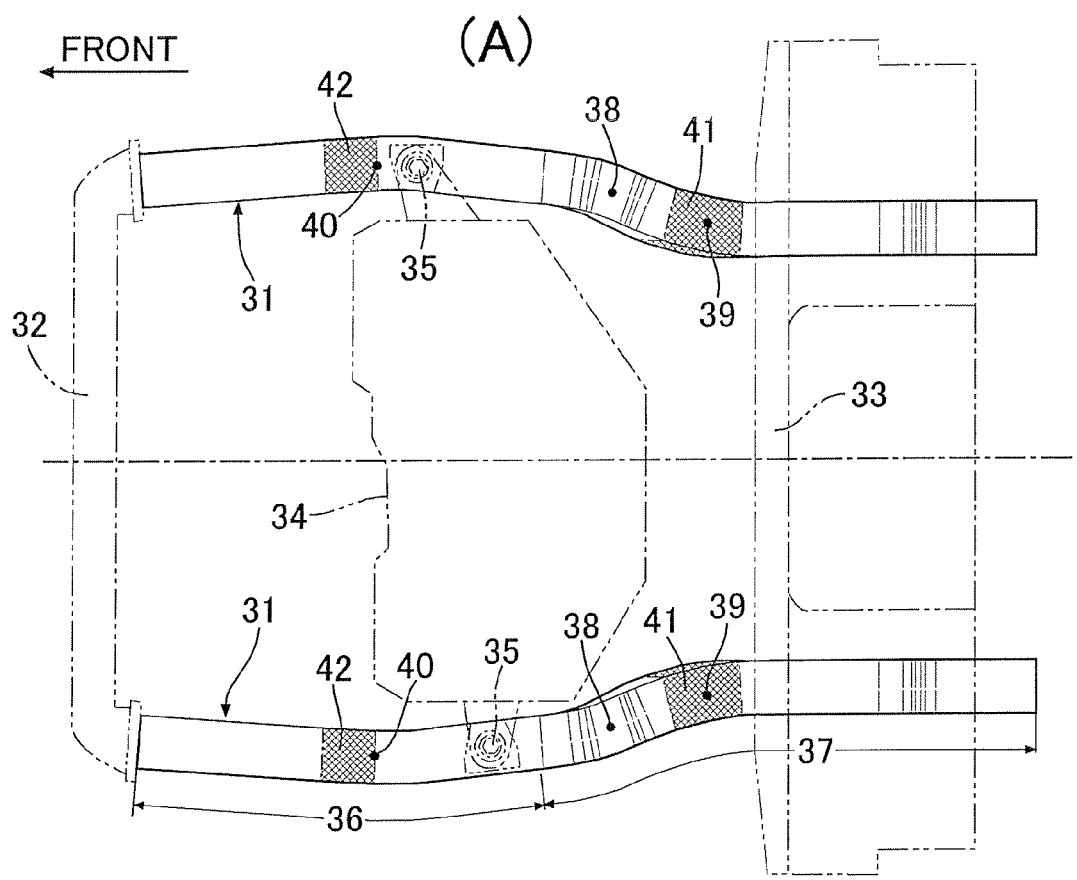
(A)
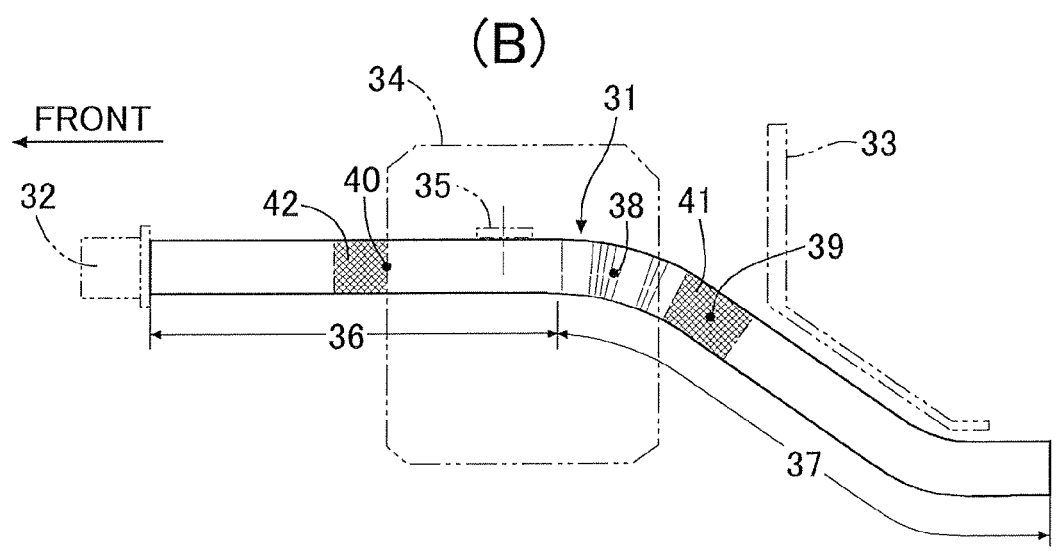
(B)

FIG.8
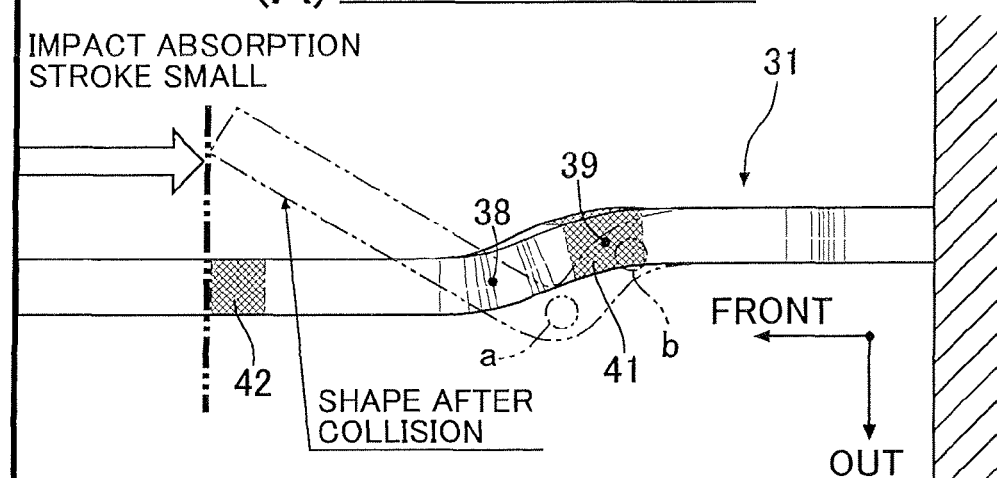
(A) COMPARATIVE EXAMPLE
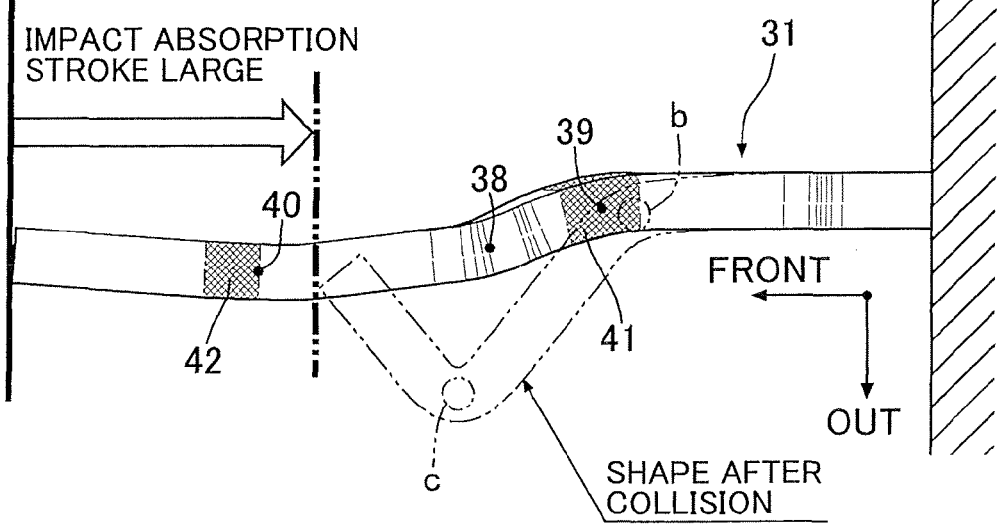
(B) EMBODIMENT

FIG.9
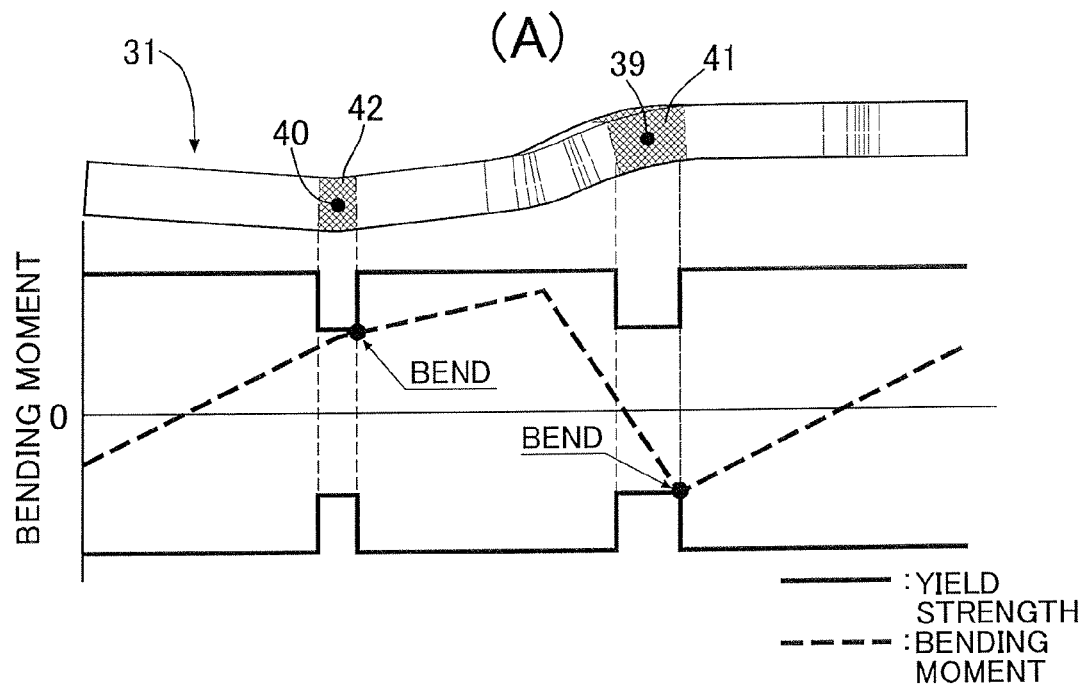
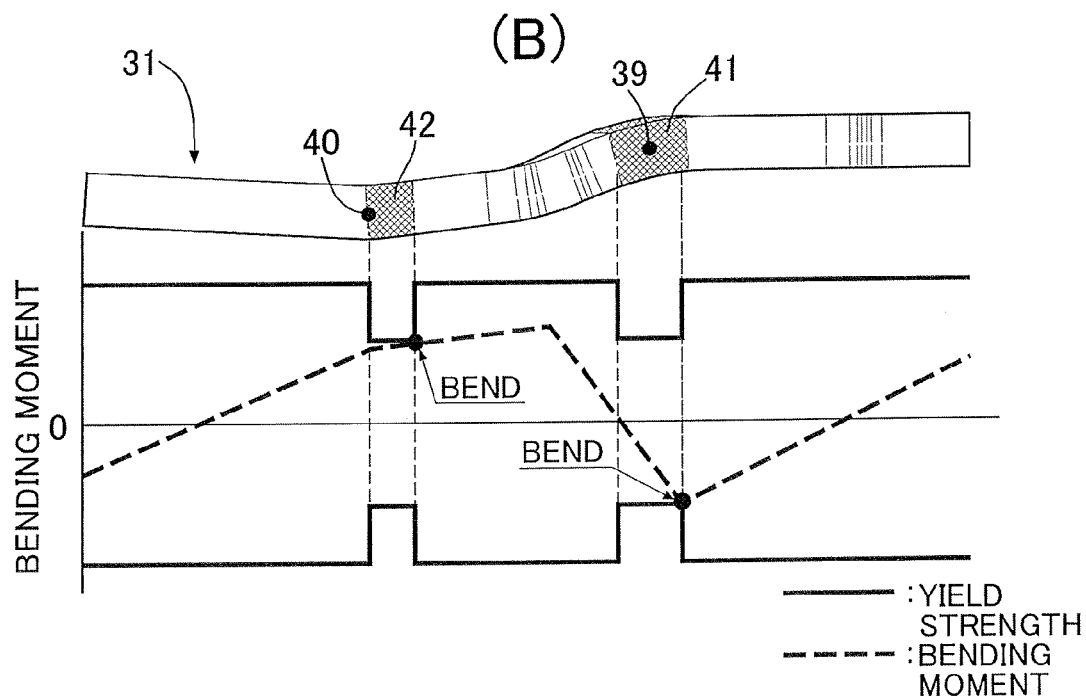

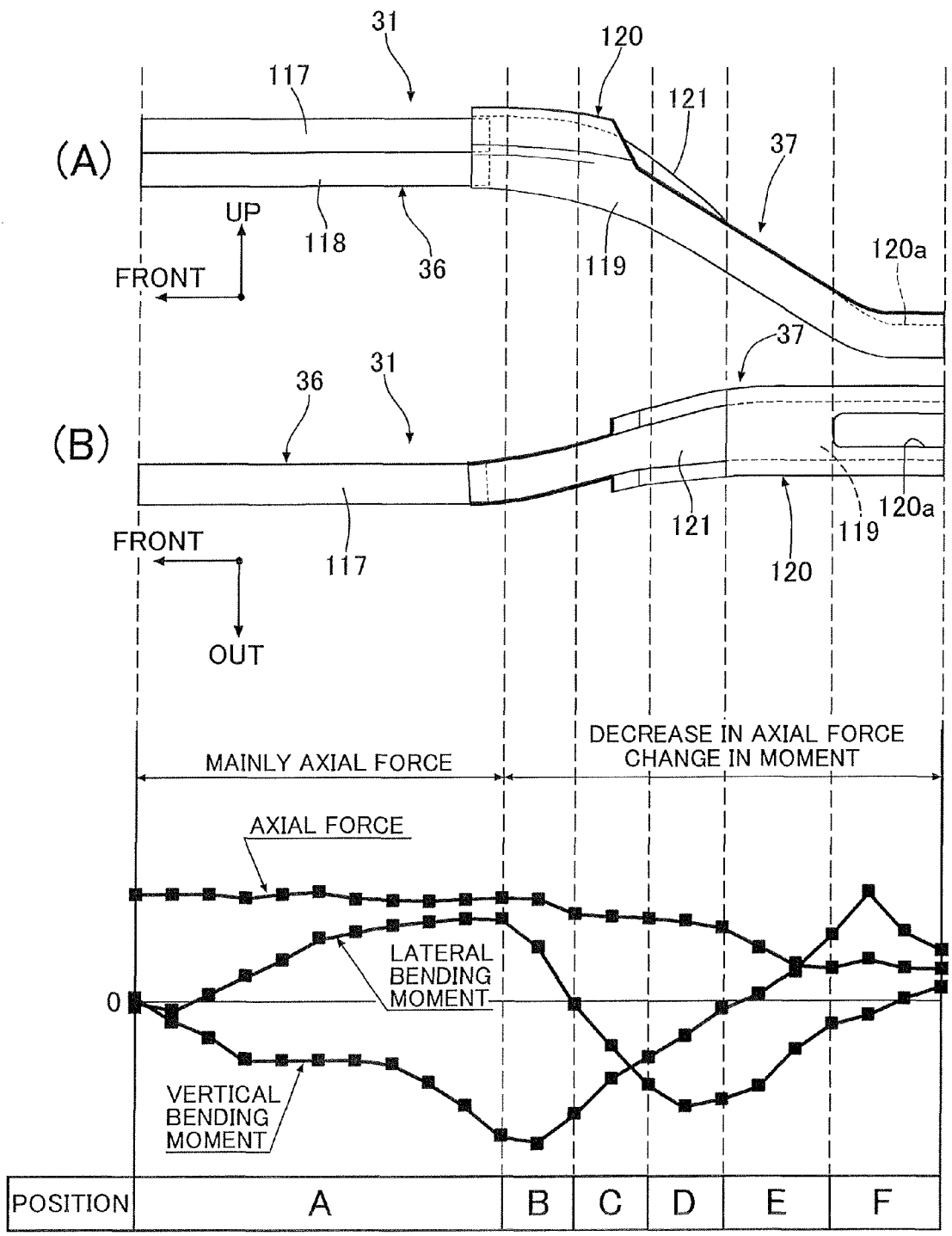

FIG.14

| | | LINEAR PART | INCLINED PART | | | | |
|---|---|---|---|---|---|---|---|
| POSITION (SEE FIG. 12) | | A | B | C | D | E | F |
| REQUIRED CROSS SECTION PERFORMANCE | AXIAL FORCE | HIGH | HIGH | MEDIUM | MEDIUM | LOW | LOW |
| | LATERAL BENDING | LOW TO HIGH | MEDIUM | MEDIUM | HIGH | MEDIUM | LOW |
| | VERTICAL BENDING | LOW TO HIGH | HIGH | MEDIUM | LOW | LOW | HIGH |
| CROSS-SECTIONAL SHAPE | | (117, 118) | (121, 120, 119, 117, 118) | (121, 120, 119) | (121, 120, 119) | (120, 119) | (120, 120a, 119) |
| REASON FOR SELECTION OF CROSS SECTION | | HIGH AXIAL FORCE → RIDGE LINES: MANY | HIGH AXIAL FORCE → RIDGE LINES: MANY (LESS THAN A) AND JOINED FLANGE | DECREASE IN VERTICAL BENDING → HEIGHT: DECREASE | DECREASE IN VERTICAL BENDING → HEIGHT: DECREASE INCREASE IN LATERAL BENDING → WIDTH: INCREASE | DECREASE IN TOTAL INPUT → CHANGED TO TWO COMPONENTS HEIGHT: DECREASE | INCREASE IN VERTICAL BENDING → HEIGHT: INCREASE BEAD ADDED TO COMPRESSION SIDE |

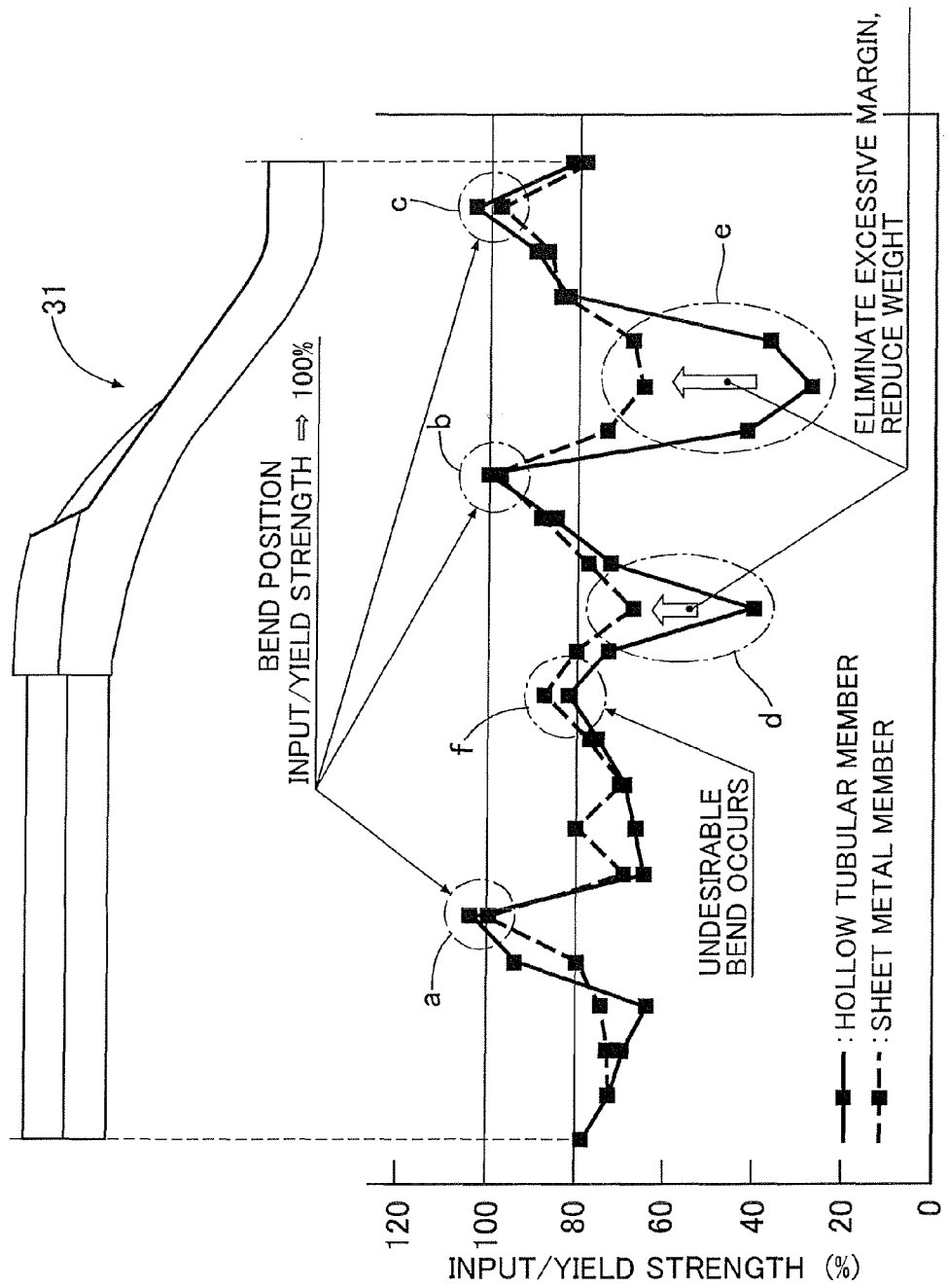

FIG.17

| | LINEAR PART | INCLINED PART | | | | | | |
|---|---|---|---|---|---|---|---|---|
| POSITION (SEE FIG.16) | A | B | C | D | E | F | CROSS-SECTIONAL SHAPE | REASON FOR SELECTION OF CROSS SECTION |
| REQUIRED CROSS SECTION PERFORMANCE — AXIAL FORCE | HIGH | HIGH | MEDIUM | MEDIUM | LOW | LOW | | |
| REQUIRED CROSS SECTION PERFORMANCE — LATERAL BENDING | LOW TO HIGH | MEDIUM | MEDIUM | HIGH | MEDIUM | LOW | | |
| REQUIRED CROSS SECTION PERFORMANCE — VERTICAL BENDING | LOW TO HIGH | HIGH | MEDIUM | LOW | LOW | HIGH | | |
| A | | | | | | | 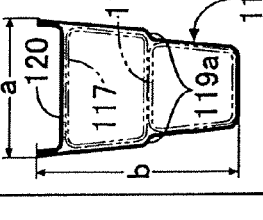 | HIGH AXIAL FORCE ↓ RIDGE LINES: MANY |
| B | | | | | | | 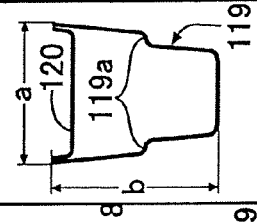 | HIGH AXIAL FORCE ↓ RIDGE LINES: MANY(STEP) DOWNWARD BENDING LARGE ↓ SHEET THICKNESS ON COMPRESSION SIDE LARGE |
| C | | | | | | | 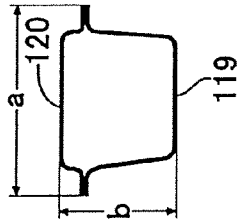 | DECREASE IN VERTICAL BENDING ↓ HEIGHT: DECREASE |
| D | | | | | | | 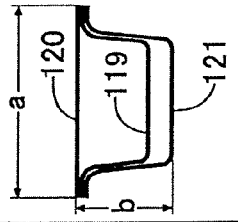 | DECREASE IN VERTICAL BENDING ↓ HEIGHT: DECREASE INCREASE IN LATERAL BENDING ↓ WIDTH: INCREASE |
| E | | | | | | | 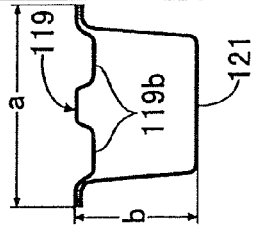 | DECREASE IN TOTAL INPUT ↓ CHANGED TO TWO COMPONENTS HEIGHT: DECREASE |
| F | | | | | | | | INCREASE IN UPWARD BENDING ↓ HEIGHT: INCREASE BEAD ADDED TO COMPRESSION SIDE SHEET THICKNESS ON COMPRESSION SIDE LARGE |

STRUCTURE FOR FRONT SIDE FRAMES OF AUTOMOBILE

TECHNICAL FIELD

The present invention relates to a structure for front side frames of an automobile in which a front side frame disposed in a fore-and-aft direction in a front part of a vehicle body is formed from a tubular hollow member having a constant cross-section, and the front side frame includes a front-side first bent part and a rear-side second bent part at the rear of a power unit mounting part having a power unit mounted thereon.

BACKGROUND ART

A hot-working device for a steel tube that includes a steel tube feed-out device that feeds out a steel tube in its longitudinal direction, a bending support point member that guidingly supports the fed out steel tube, a high-frequency heating coil that continuously heats the steel tube, a bending device that bends the steel tube by gripping it and imparting a bending moment to the heated portion, and a cooling device that carries out a hardening treatment by quenching the bent steel tube is known from Patent Document 1 below. In accordance with this invention, since bending of a steel tube and a hardening treatment can be carried out at the same time, it is possible to obtain a high strength front side frame that has been bent into a predetermined shape.

Patent Document 1: International Application Laid-open No. WO2008/123506

DISCLOSURE OF INVENTION

Problems to be Solved by the Invention

With regard to front side frames of an automobile, a front half supporting a power unit formed from an engine and a transmission is formed into a substantially linear shape and a rear half connected to the rear of the front half is formed into an S-shape in which bending is downward and inward in the vehicle width direction in order to avoid interference with left and right front wheels.

Therefore, when the load of a frontal collision of the automobile is inputted into the front end of the front side frame, the bent portion of the rear half bends to thus ensure that there is an impact absorption stroke, but since it is difficult to appropriately bend the front half, which has a substantially linear shape, there is still room for the impact absorption stroke to be increased.

The present invention has been accomplished in light of the above-mentioned circumstances, and it is an object thereof to further increase the impact absorption stroke by appropriately bending a front side frame of an automobile when it is involved in a frontal collision.

Means for Solving the Problems

In order to attain the above object, according to a first aspect of the present invention, there is provided a structure for front side frames of an automobile in which a front side frame disposed in a fore-and-aft direction in a front part of a vehicle body is formed from a tubular hollow member having a constant cross-section, and the front side frame comprises a front-side first bent part and a rear-side second bent part at the rear of a power unit mounting part for a power unit to be mounted thereon, characterized in that the front side frame comprises a third bent part that bends convexly outward in the vehicle width direction in front of the power unit mounting part, a first weak part that is weaker than other portions of the front side frame is formed in the vicinity of the second bent part, and a second weak part that is weaker than other portions of the front side frame is formed in the vicinity of the third bent part.

Further, according to a second aspect of the present invention, in addition to the first aspect, the front side frame has a strength enhanced by a hardening treatment.

Furthermore, according to a third aspect of the present invention, in addition to the first or second aspect, the front side frame comprises yet another bent part in front of or at the rear of the third bent part.

Moreover, according to a fourth aspect of the present invention, in addition to any one of the first to third aspects, the second weak part in the vicinity of the third bent part is offset forward or rearward from the position of the third bent part.

Further, according to a fifth aspect of the present invention, in addition to any one of the first to fourth aspects, the front side frame is produced by feeding out a steel tube from a steel tube feed-out device along a longitudinal direction thereof, heating the steel tube fed out from the steel tube feed-out device by means of a high-frequency heating coil, bending the steel tube heated by the high-frequency heating coil by means of a bending device, and cooling the steel tube bent by the bending device by means of a cooling device to thus carry out a hardening treatment.

Furthermore, according to a sixth aspect of the present invention, in addition to the fifth aspect, the second weak part is present on the third bent part, and the second weak part is formed by subjecting part of the front side frame that has been hardened to an annealing treatment.

Moreover, according to a seventh aspect of the present invention, in addition to the first aspect, the power unit mounting part is formed by vertically superimposing two tubular hollow members, and the kick-up part is formed so as to have a closed cross-section by combining at least two sheet metal members.

Further, according to an eighth aspect of the present invention, in addition to the seventh aspect, the tubular hollow member has a polygonal cross-section.

Furthermore, according to a ninth aspect of the present invention, in addition to the eighth aspect, the tubular hollow member has a ridge line connected to a ridge line of the sheet metal member.

Moreover, according to a tenth aspect of the present invention, in addition to any one of the seventh to ninth aspects, the kick-up part is bent into an S-shape while having a front-side first bent part and a rear-side second bent part, and an intermediate part interposed between the first and second bent parts has an aspect ratio of less than 1.

Further, according to an eleventh aspect of the present invention, in addition to the tenth aspect, the aspect ratio increases in going from the intermediate part toward the second bent part.

A fourth bent part 43 of an embodiment corresponds to the other bent part of the present invention, first and second tubular hollow members 117 and 118 of the embodiment correspond to the tubular hollow member of the present invention, and first to third sheet metal members 119 to 121 of the embodiment correspond to the sheet metal member of the present invention.

Effects of the Invention

In accordance with the first aspect of the present invention, since, among the first and second bent parts to the rear of the power unit mounting part of the front side frame formed from the tubular hollow member having a constant cross-section, the first weak part is provided in the vicinity of the rear-side second bent part, and the second weak part is provided in the vicinity of the third bent part, which is bent convexly outward in the vehicle width direction in the power unit mounting part, when an automobile is involved in a frontal collision it becomes possible for the front side frame formed from the tubular hollow member and having high strength to bend not only via the first weak part but also via the second weak part, thereby enabling the impact absorption stroke to be increased and the effect in absorbing collision energy to be enhanced.

Furthermore, in accordance with the second aspect of the present invention, since the strength of the front side frame is enhanced by the hardening treatment, it becomes possible to enhance the strength of the front side frame without providing a special reinforcing component, thereby reducing the weight.

Moreover, in accordance with the third aspect of the present invention, since the front side frame includes yet another bent part in front of or to the rear of the third bent part, the degree of freedom in design of the shape of the front side frame increases. Since the front side frame bends via the weak part in the vicinity of the third bent part when the automobile is involved in a frontal collision, the other bent parts do not bend due to the bending moment acting thereon becoming small.

Furthermore, in accordance with the fourth aspect of the present invention, since the second weak part can be bent even when the second weak part in the vicinity of the third bent part is offset forward or rearward from the position of the third bent part, it is possible to enhance the degree of freedom in design of the front side frame by changing the position of the second weak part.

Moreover, in accordance with the fifth aspect of the present invention, since the front side frame is produced by heating the steel tube fed out from the steel tube feed-out device by means of the high-frequency heating coil, bending it by means of the bending device, and then subjecting it to the hardening treatment by cooling by means of the cooling device, it is possible to easily produce a front side frame having high strength by carrying out the bending and the hardening treatment at the same time.

Furthermore, in accordance with the sixth aspect of the present invention, since the second weak part is present on the third bent part, the second weak part can be formed by subjecting part of the front side frame that has been hardened to an annealing treatment. Moreover, the second weak part is relieved of internal stress by the annealing treatment and has an internal structure that is uniformly softened, and it is possible to absorb collision energy via the entire cross-section of the second weak part when a collision load is inputted while ensuring the vehicle body rigidity when the situation is normal.

In accordance with the seventh aspect of the present invention, since the power unit mounting part, which receives a large axial force when the automobile is involved in a frontal collision, is formed by vertically superimposing two tubular hollow members, it is possible to easily ensure that there is a high strength that can withstand the axial force, and since the kick-up part, which receives a different level of bending moment according to the section, is formed by combining at least two sheet metal members so as to have a closed cross-section, it is easy to set or adjust the strength according to the bending moment applied. This enables surplus strength to be minimized while ensuring that there is a necessary strength, thus achieving a balance between light weight and strength of the front side frame.

Furthermore, in accordance with the eighth aspect of the present invention, since the tubular hollow member has a polygonal cross-section, it is possible to enhance the strength by increasing the number of ridge lines.

Moreover, in accordance with the ninth aspect of the present invention, since the ridge line of the tubular hollow member is connected to the ridge line of the sheet metal member, it is possible to transmit a load from the ridge line of the tubular hollow member to the ridge line of the sheet metal member, thus enhancing the strength of a section where the power unit mounting part and the kick-up part are joined.

Furthermore, in accordance with the tenth aspect of the present invention, since the kick-up part is bent into an S-shape while having the front-side first bent part and the rear-side second bent part, although the intermediate part interposed between the first and second bent parts receives a bending moment in the left-and-right direction, making the aspect ratio of the part less than 1 to thus form a laterally long cross-sectional shape enables a strength that can withstand the bending moment to be ensured.

Moreover, in accordance with the eleventh aspect of the present invention, since the aspect ratio increases in going from the intermediate part of the kick-up part toward the second bent part, even if the bending moment in the vertical direction of the front side frame increases in that portion, it is possible to ensure that there is a strength that can withstand the bending moment by increasing the height of the cross section by increasing the aspect ratio.

BRIEF DESCRIPTION OF DRAWINGS

FIG. 5 is a diagram showing the placement of left and right front side frames. (first embodiment)

FIG. 8 is a view for explaining a deformation state of the front side frame when it is involved in a frontal collision. (first embodiment)

FIG. 9 is a view, corresponding to FIG. 7. (second and third embodiments)

FIG. 13 is a diagram showing an axial force and a moment when the load of a frontal collision is inputted into the front side frame. (ninth embodiment)

FIG. 14 is a diagram showing a cross-sectional shape of each part of the front side frame. (ninth embodiment)

FIG. 15 is a graph showing the input/yield strength ratio along the longitudinal direction of the front side frame (ninth embodiment).

FIG. 17 is a diagram showing a cross-sectional shape of each part of the front side frame. (tenth embodiment)

EXPLANATION OF REFERENCE NUMERALS AND SYMBOLS

Figure 1:
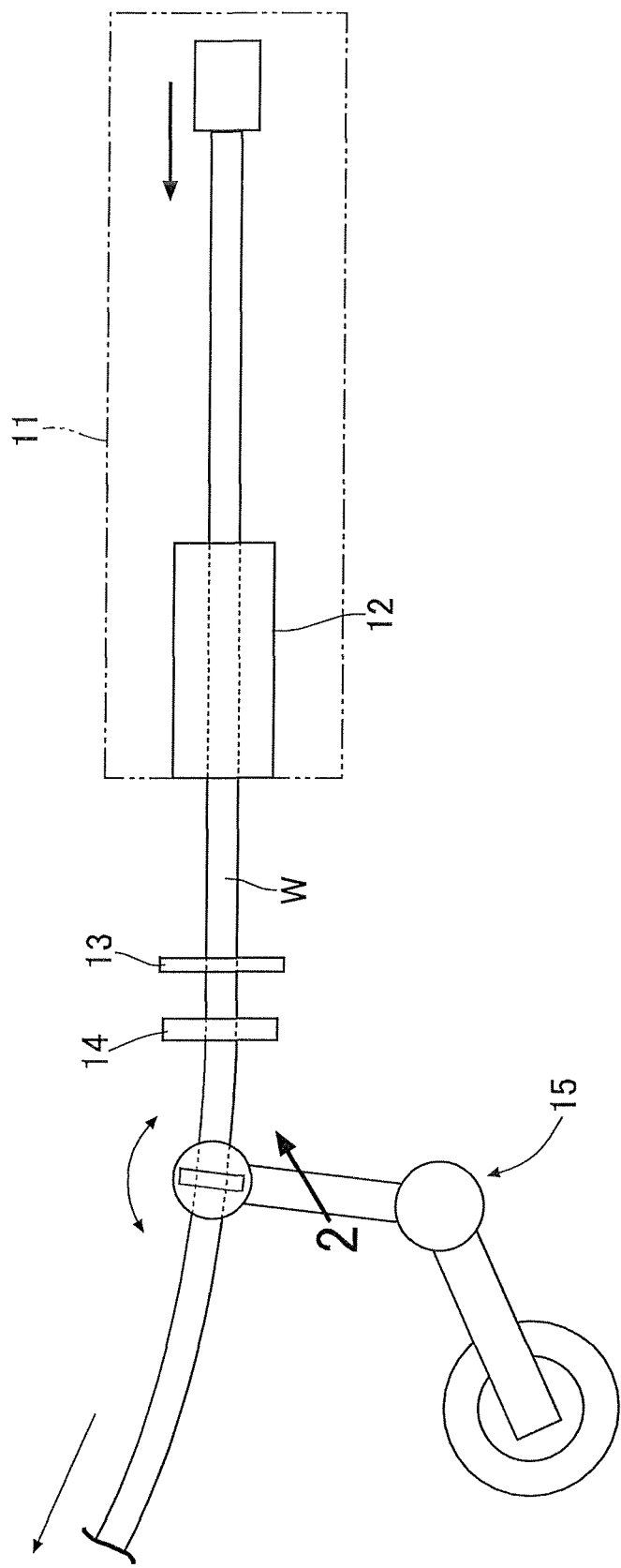
FIG. 1 is a diagram showing the overall arrangement of a hot-working device for a steel tube. (first embodiment)

W Steel tube
11 Steel tube feed-out device
13 High-frequency heating coil
14 Cooling device
15 Bending device
31 Front side frame
34 Power unit
36 Power unit mounting part
37 Kick-up part
38 First bent part
39 Second bent part
40 Third bent part
41 First weak part
42 Second weak part
43 Fourth bent part (another bent part)
114 Front-side bent part
115 Intermediate part
116 Rear-side bent part
117 First tubular hollow member (tubular hollow member)
118 Second tubular hollow member (tubular hollow member)
119 First sheet metal member (sheet metal member)
120 Second sheet metal member (sheet metal member)
121 Third sheet metal member (sheet metal member)
λ Aspect ratio

BEST MODES FOR CARRYING OUT THE INVENTION

A first embodiment of the present invention is explained below by reference to FIG. 1 to FIG. 8. The fore-and-aft direction and the left-and-right direction (vehicle width direction) referred to in the present specification are defined with reference to an occupant seated on a driver's seat.

First embodiment

As shown in FIG. 1, a hot-working device that carries out a thermal treatment at the same time as heating and bending into a predetermined shape a steel tube W, which is a material for a front side frame of an automobile, includes a steel tube feed-out device 11 that feeds out in the longitudinal direction the steel tube W, which is formed so as to have a closed cross-section by roll-forming, a bending support point member 12 that is provided in an outlet section of the steel tube feed-out device 11, a high-frequency heating coil 13 that is provided downstream of the bending support point member 12, a cooling device 14 that is provided downstream of the high-frequency heating coil 13, and a bending device 15, which is a robot that is provided downstream of the cooling device 14. The steel tube W is a member having a linear shape having a constant rectangular cross-section in the longitudinal direction. After the steel tube W is curved into the predetermined shape by applying a bending moment by means of the bending device 15 in a state in which it is heated by the high-frequency heating coil 13, it is quenched by means of cooling water issued from the cooling device 14, thus carrying out a hardening treatment.

Figure 2:
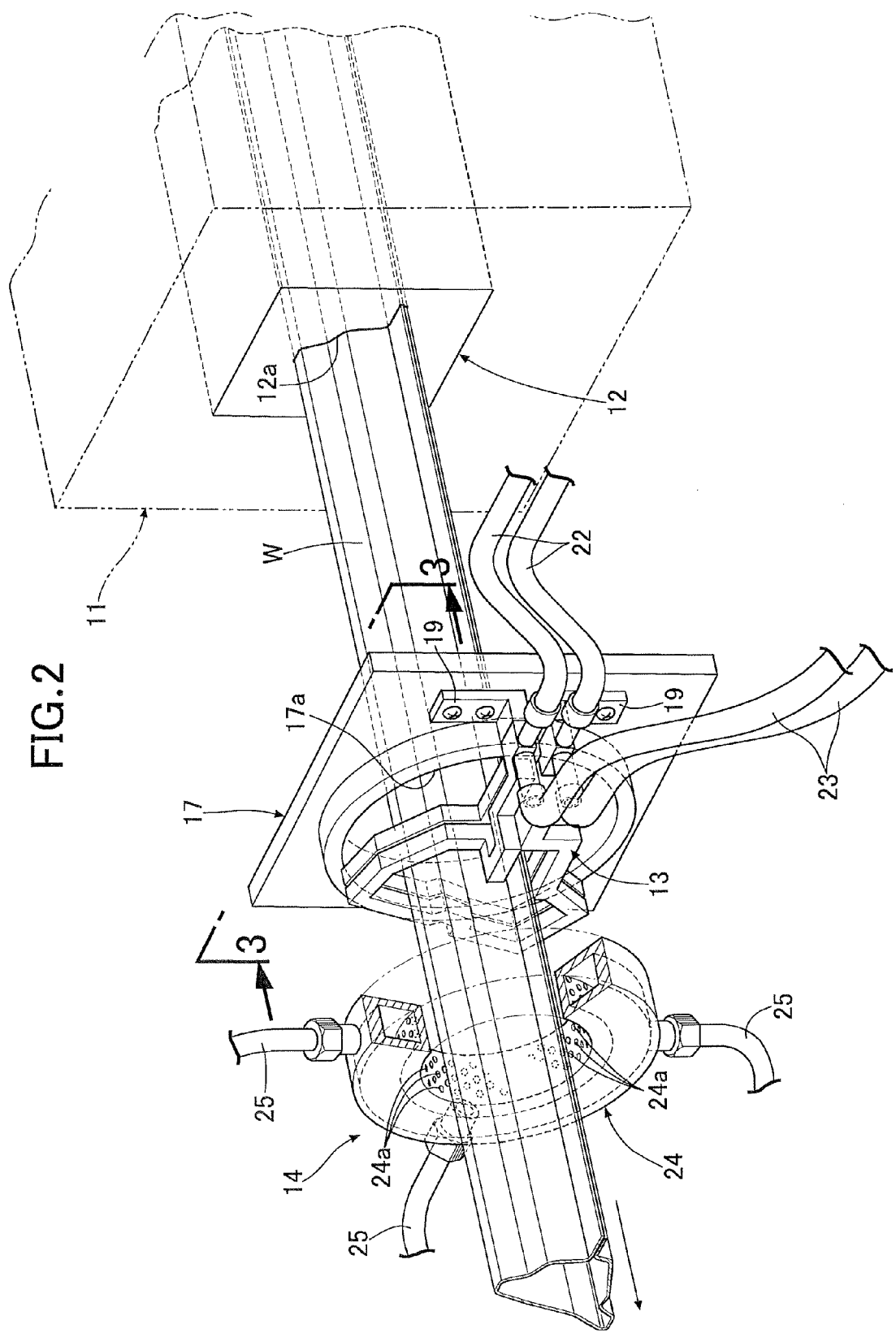
FIG. 2 is an enlarged view in the direction of arrow 2 in FIG. 1. (first embodiment)
Figure 3:
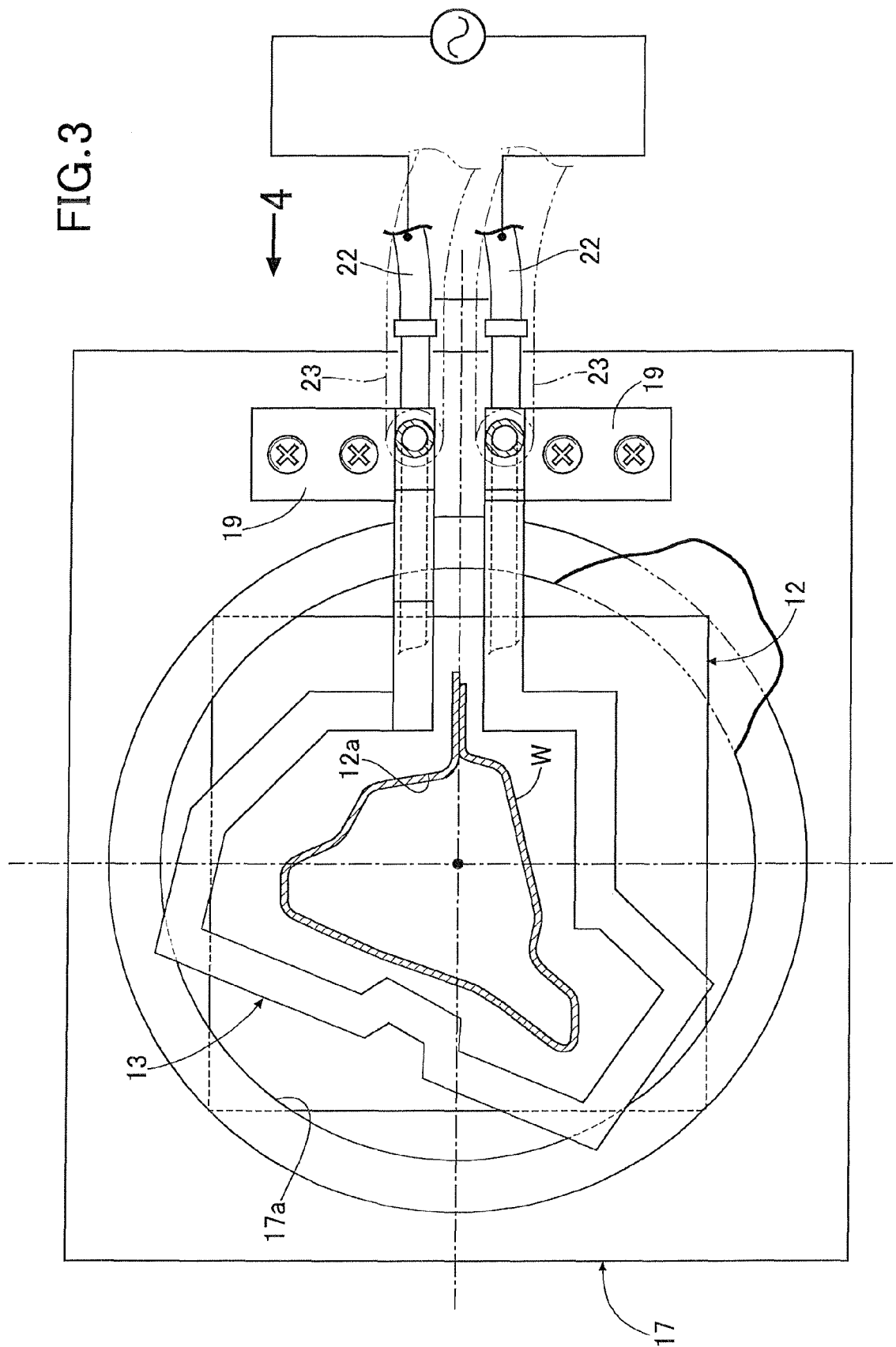
FIG. 3 is a view from arrowed line 3-3 in FIG. 2. (first embodiment)
Figure 4:
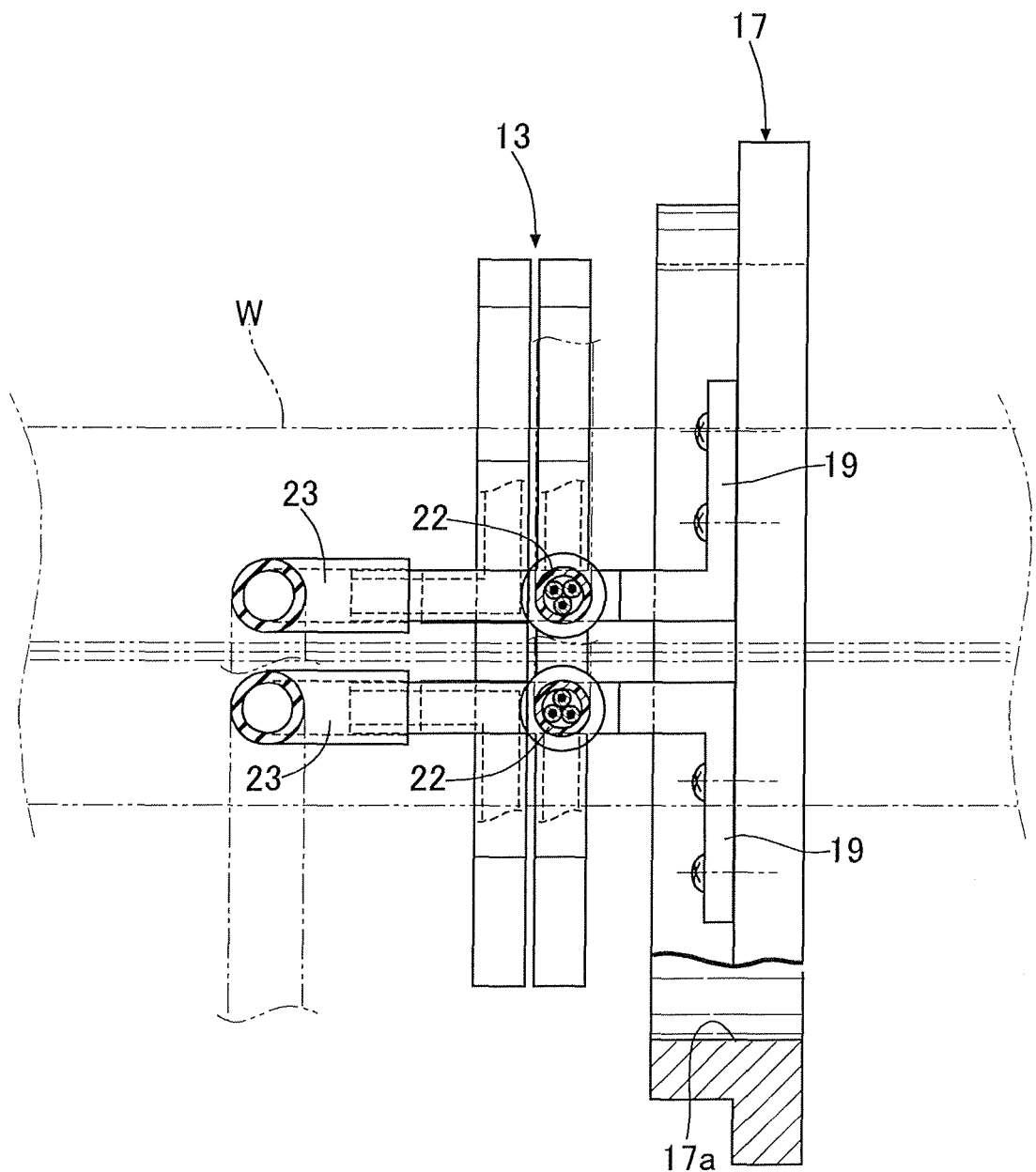
FIG. 4 is a view in the direction of arrow 4 in FIG. 3. (first embodiment)

As shown in FIG. 2 to FIG. 4, a guide hole 12a is formed in a central part of the bending support point member 12, the guide hole 12a having the same shape as the cross-sectional shape of the steel tube W. The steel tube W fed out from the steel tube feed-out device 11 passes through the guide hole 12a of the bending support point member 12 while sliding on an inner peripheral face thereof. The high-frequency heating coil 13 is disposed at a position spaced away from the bending support point member 12 by a predetermined distance toward the downstream side in the feed-out direction for the steel tube W, and is supported on a plate-shape stand 17 having an opening 17a formed in the middle. The stand 17, which is close to the high-frequency heating coil 13, is formed from Bakelite, glass epoxy, rigid plastic, etc. having heat resistance so that it is not damaged by being heated by means of magnetic flux from the high-frequency heating coil 13.

The high-frequency heating coil 13 is formed from two turns of coil and fixed to the stand 17 via two mounting stays 19 and 19 so as to form a substantially constant gap between the inner periphery thereof and the outer periphery of the steel tube W. Connected to opposite ends of the high-frequency heating coil 13 are two cables 22 and 22 for supplying electric power thereto. The high-frequency heating coil 13 has a water jacket formed in the interior, and two hoses 23 and 23 for supplying cooling water are connected to opposite ends of the water jacket.

The cooling device 14 includes an annular cooling water tank 24 surrounding the outer periphery of the steel tube W, four cooling water supply pipes 25 connected to an outer peripheral face of the cooling water tank 24, and a large number of cooling water issuing holes 24a formed in an inner peripheral face of the cooling water tank 24.

In accordance with the hot-working device having the above structure, the steel tube W fed out from the steel tube feed-out device 11 is gripped by a clamp arm of the bending device 15, which is a robot, at a position after passing through the bending support point member 12, the high-frequency heating coil 13, and the cooling device 14. When a high frequency current is supplied to the high-frequency heating coil 13 via the cables 22 and 22, an eddy current is generated in the interior of the steel tube W by means of the magnetic field formed around the high frequency heating coil 13, and the steel tube W is heated to a temperature that is at least the A3 transformation point by virtue of Joule heating. Therefore, controlling the bending moment applied to the steel tube W by means of the bending device 15 while continuously feeding the steel tube W enables a heated portion of the steel tube W to be bent into a desired shape to thus produce the shape of the front side frame. Since the steel tube W thus bent is quenched with cooling water issued from the cooling water issuing holes 24a of the cooling water tank 24 of the cooling device 14 and hardened, not only is it possible to carry out bending and a hardening treatment of the steel tube W continuously, but it is also possible to reduce the weight by eliminating the need for enhancing the strength by providing the front side frame with a reinforcing member.

The high-frequency heating coil 13 itself generates heat by the passage of electricity and attains a high temperature, but supplying cooling water to the interior thereof via the hoses 23 and 23 makes it possible to prevent the high-frequency heating coil 13 from overheating.

As shown in FIG. 5, left and right front side frames 31 and 31 formed by bending and hardening the steel tube W by means of the hot-working device are disposed in the fore-and-aft direction in a vehicle body front part, a bumper beam 32 is connected between front ends thereof, and a bulkhead lower panel 33 separating an engine compartment from a passenger compartment is connected to an upper face of a rear part thereof. Furthermore, a power unit 34 having an engine and a transmission joined thereto is supported between the intermediate parts in the fore-and-aft direction via left and right mounting members 35 and 35.

The front side frame 31 integrally includes a power unit mounting part 36, which is a front half thereof, and a kick-up part 37, which is a rear half thereof. The kick-up part 37 bends in a front-side first bent part 38 and a rear-side second bent part 39 to thus extend from the rear end of the front side frame 31 upward toward the front and outward in the left-and-right direction (vehicle width direction). Although the power unit mounting part 36 extends substantially horizontally when viewed from the side, the power unit mounting part 36 bends, in a third bent part 40 provided therein, convexly outward in the vehicle width direction when viewed from above. These first to third bent parts 38, 39, and 40 are formed by bending the steel tube W by means of the hot-working device.

The front side frame 31 includes a first weak part 41 having partially lowered strength at the position of the second bent part 39 and a second weak part 42 having partially lowered strength at a position immediately before the third bent part 40. Since the first weak part 41 is present in a curved part of the front side frame 31, it is formed by subjecting only part of the front side frame 31, which is formed by subjecting the entirety to a hardening treatment, to an annealing treatment. On the other hand, since the second weak part 42 is present in a linear part of the front side frame 31, it is formed by temporarily stopping the application of electricity to the high-frequency heating coil 26 during hot working to thus interrupt the hardening treatment for that portion.

Figure 6:
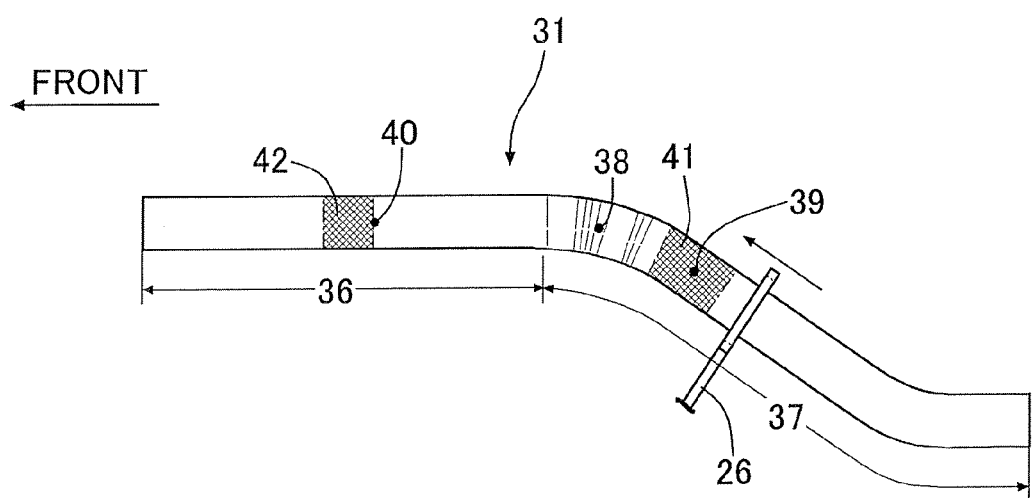
FIG. 6 is a diagram for explaining an annealing treatment. (first embodiment)

As shown in FIG. 6, the high-frequency heating coil 26 is loosely fitted around the outer periphery of the front side frame 31 formed by bending and hardening the steel tube W by means of the hot-working device and moved, and electricity is applied only when the high-frequency heating coil 26 passes through the positions of the first weak part 41 and the second weak part 42 of the front side frame 31 to thus carry out heating. The heated parts are then gradually cooled to thus carry out an annealing treatment, thereby enabling the first weak part 41 and the second weak part 42, which have not been subjected to a hardening treatment, to be formed in the front side frame 31, which has its entirety subjected to a hardening treatment.

The operation of the embodiment of the present invention having the above arrangement is now explained.

Figure 11:
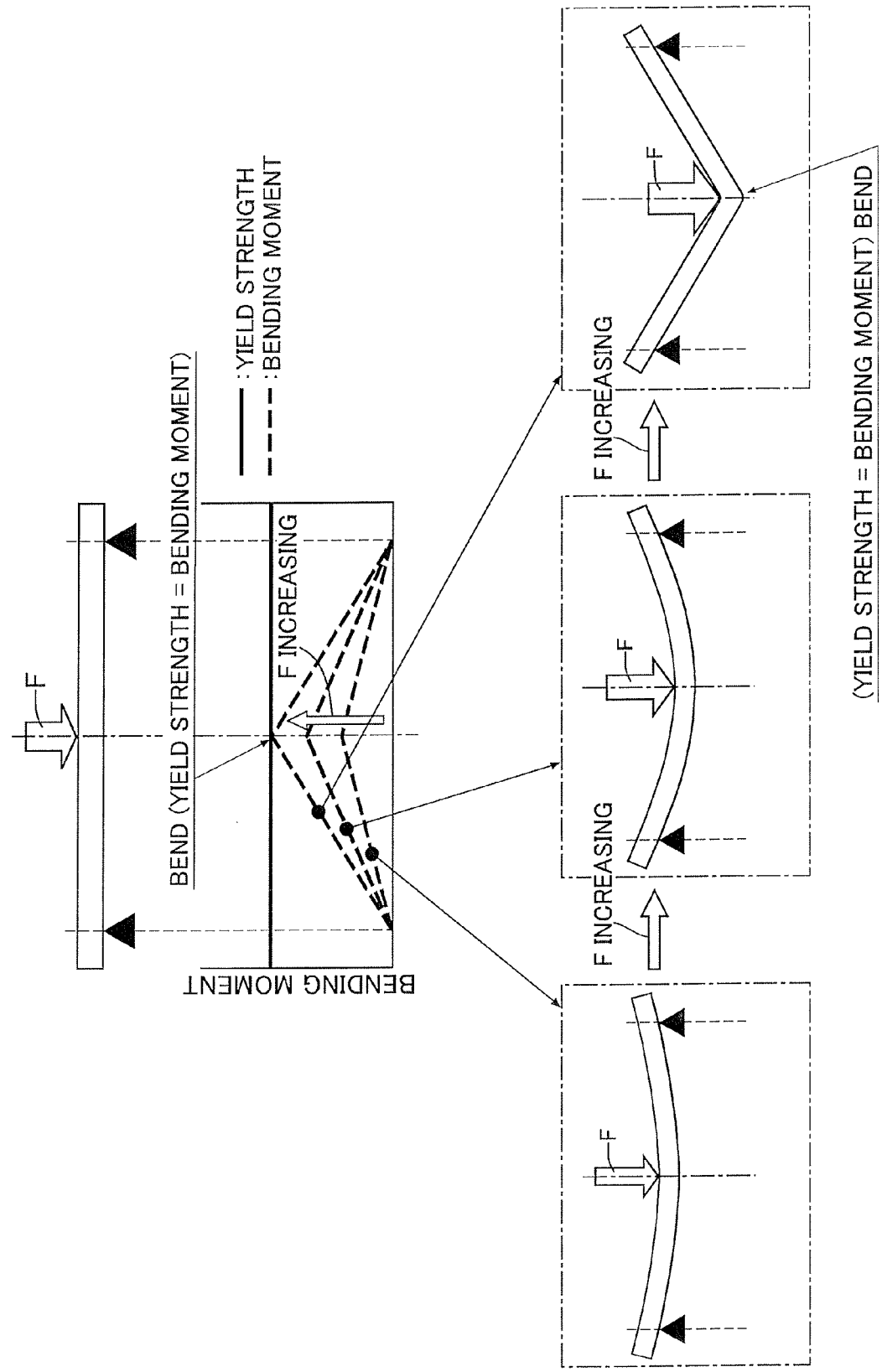
FIG. 11 is a diagram for explaining the relationship between the bending moment applied to a beam and the yield strength of the beam.

First, referring to FIG. 11, the way in which a graph for determining the position of bending of the front side frame 31 is used is explained.

It is assumed that a load F is applied to a central part of a simple support beam, which represents the front side frame 31, the bending moment acting on the simple support beam has a distribution with the shape of an isosceles triangle in which it is zero at support points at opposite ends and it becomes a maximum value at the point of action of the load F (broken lines). As the size of the load F gradually increases, the maximum value of the bending moment also gradually increases. The horizontally extending solid line denotes beam yield strength (maximum bending moment that can be withstood without bending), and when the maximum value of the bending moment, which increases in response to an increase in the load F, exceeds the yield strength, the beam cannot withstand and bends at that position.

Figure 7:
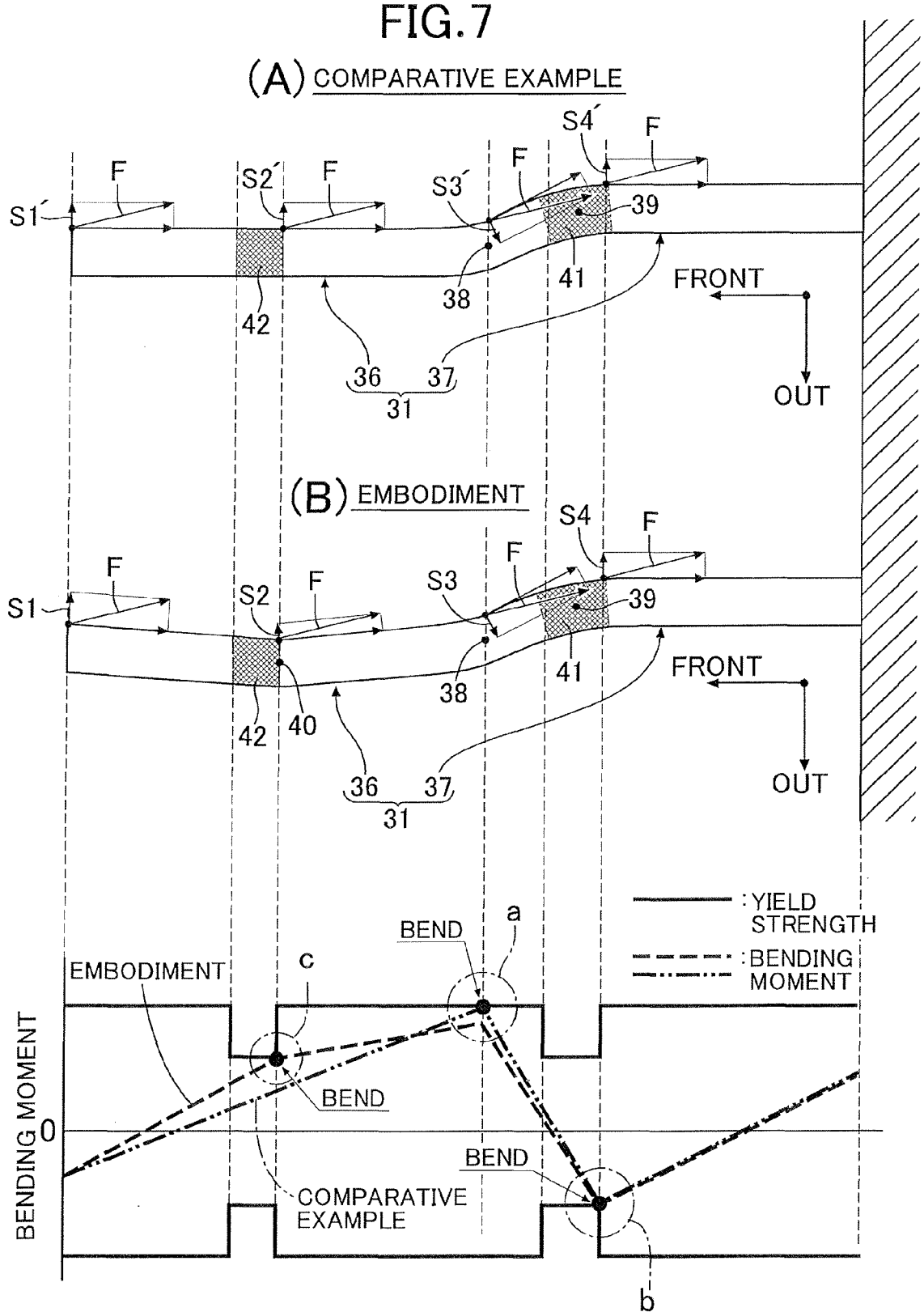
FIG. 7 is a view for explaining a bending moment that acts on the front side frame when it is involved in a frontal collision. (first embodiment)

FIG. 7 (B) shows the front side frame 31 of the embodiment, which includes the first bent part 38, the second bent part 39, and the third bent part 40, and the axis of the front side frame 31 bends convexly outward in the vehicle width direction around the third bent part 40. On the other hand, FIG. 7 (A) shows a front side frame 31 of a Comparative Example, which includes only a first bent part 38 and a second bent part 39 and does not include a third bent part 40, and the front side frame 31 extends linearly in the fore-and-aft direction without bending at the position corresponding to the third bent part 40.

When the automobile is involved in a frontal collision with an obstacle and a rearward collision load is inputted into the front end of the front side frame 31, if a frictional force that is inward in the vehicle width direction acts between the automobile and the obstacle, the load F acting on the front side frame 31 is the resultant force of the collision load in the fore-and-aft direction and the frictional force and is inclined inward in the vehicle width direction. The load F is decomposed into an axial force in the axial direction of the front side frame 31 and a shear force that is perpendicular to the axis, and a bending moment acts on each part of the front side frame 31 according to the shear force.

Since the front side frame 31 of the Comparative Example includes a front-side power unit mounting part 36 having a linear shape, shear forces S1' and S2', which are inward in the vehicle width direction in that section, are constant. On the other hand, since the front side frame 31 of the embodiment includes the power unit mounting part 36, which includes the third bent part 40 and bends convexly outward in the vehicle width direction, the shear force 51 before the third bent part 40 becomes large and the shear force S2 after the third bent part 40 becomes small. Since the shape of the kick-up part 37 is the same for the Comparative Example and the embodiment, the shear force is also the same. The direction of shear forces S3' and S3 after the first bent part 38 is reversed and faces outward in the vehicle width direction, and the direction of shear forces S4' and S4 is reversed again at a position just before the second bent part 39 and faces inward in the vehicle width direction.

The two solid lines in the lower graph of FIG. 7 show the yield strength when a rightward bending moment or a leftward bending moment is applied to the front side frame 31, and the two indentations of each yield strength line show that the yield strength is decreased by weakening due to the first weak part 41 and the second weak part 42.

The double-dotted broken line shows the bending moment acting on the front side frame 31 of the Comparative Example of FIG. 7 (A). The bending moment reaches the yield strength at a position a in the vicinity of the first bent part 38 and a position b in the vicinity of the second bent part 39, suggesting that the front side frame 31 bends at two positions, that is, position a and position b.

The broken line shows the bending moment acting on the front side frame 31 of the embodiment of FIG. 7 (B). The bending moment increases rapidly toward position c due to an increase in the shear force in a portion in front of the third bent part 40, and the bending moment gradually increases in going from position c toward position a due to a decrease in the shear force in a portion to the rear of the third bent part 40. As a result, the bending moment reaches the yield strength at position c in the vicinity of third bent part 40 and at position b in the vicinity of the second bent part 39, and the front side frame 31 bends, but since at position a the bending moment does not reach the yield strength, the front side frame 31 does not bend.

As described above, in the Comparative Example, in which the power unit mounting part 36 of the front side frame 31 does not include the third bent part 40, since the front side frame 31 bends in the vicinity of the first bent part 38 and the second bent part 39 of the kick-up part 37, as shown in FIG.

8 (A) the impact absorption stroke with which the front end of the front side frame 31 moves backward becomes small, and there is a possibility that sufficient impact absorption performance cannot be obtained. On the other hand, in the embodiment, in which the power unit mounting part 36 of the front side frame 31 includes the third bent part 40, since the front side frame 31 bends in the vicinity of the third bent part 40 of the power unit mounting part 36 and in the vicinity of the second bent part 39 of the kick-up part 37, as shown in FIG. 8 (B) the impact absorption stroke with which the front end of the front side frame 31 moves backward becomes large, and sufficient impact absorption performance can be obtained.

Moreover, since, after the steel tube W is subjected to bending and hardening by use of the hot-working device to thus form the front side frame 31 of an automobile, the first weak part 41 and the second weak part 42 are post-processed by an annealing treatment of the steel tube W, the first weak part 41 and the second weak part 42 formed by the annealing treatment are relieved of internal stress and have a uniformly softened internal structure, and it is thereby possible to absorb collision energy via the entire cross-section of the first weak part 41 and the second weak part 42 when a collision load is inputted while ensuring that there is vehicle body rigidity when the situation is normal.

A second embodiment and a third embodiment of the present invention are now explained by reference to FIG. 9.

[Second and Third Embodiments]

In the first embodiment, the second weak part 42 is provided offset forward of the third bent part 40, but as shown in FIG. 9 (A) in the second embodiment a second weak part 42 is provided at a position of a third bent part 40, and as shown in FIG. 9 (B) in the third embodiment a second weak part 42 is provided offset rearward of a third bent part 40. That is, the second weak part 42 may be provided in the vicinity of the third bent part 40, and the degree of freedom in design of the front side frame 31 can be increased by changing the position of the second weak part 42 while achieving the same operational effects as those of the first embodiment.

In the second embodiment of FIG. 9 (A), the second weak part 42 is provided at the position of the third bent part 40, and since it is impossible to stop heating of the third bent part 40 during hot working, it is necessary to form the second weak part 42 by subjecting the hardened third bent part 40 to an annealing treatment. On the other hand, in the third embodiment of FIG. 9 (B), the second weak part 42 is provided offset from the position of the third bent part 40, and since it is possible to stop heating of the third bent part 40 during hot working, the second weak part 42 may be formed by not carrying out a hardening treatment for that portion.

Fourth to eighth embodiments of the present invention are now explained by reference to FIG. 10.

[Fourth to Eighth Embodiments]

Figure 10:
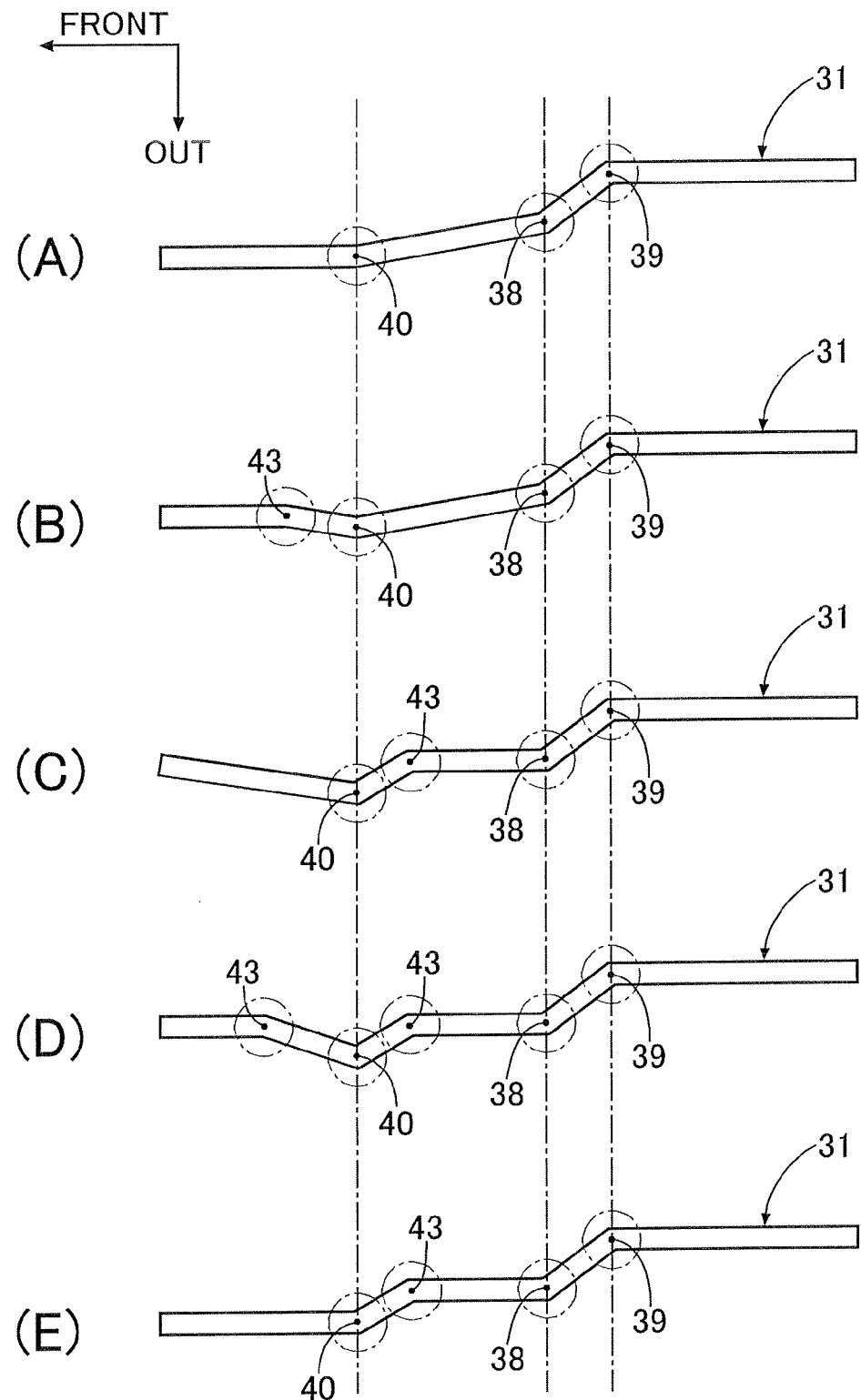
FIG. 10 is a diagram showing another embodiment of the front side frame. (fourth to eighth embodiments)

In the fourth embodiment shown in FIG. 10 (A), a section in front of a third bent part 40 extends along the fore-and-aft direction, and a section to the rear of the third bent part 40 is inclined inward in the vehicle width direction. FIG. 10 (B) to FIG. 10 (D) show embodiments that include a fourth bent part 43 in addition to a first bent part 38, a second bent part 39, and a third bent part 40; the fifth embodiment of FIG. 10 (B) includes the fourth bent part 43 forward of the third bent part 40, the sixth embodiment of FIG. 10 (C) includes the fourth bent part 43 rearward of the third bent part 40, and the seventh embodiment of FIG. 10 (D) includes two fourth bent parts 43 and 43 forward and rearward of the third bent part 40. The eighth embodiment shown in FIG. 10 (E) includes a fourth bent part 43 rearward of a third bent part 40, and the section to the rear of the fourth bent part 43 extends along the fore-and-aft direction.

Since all of these embodiments include the front side frame 31 bending convexly outward in the vehicle width direction in the third bent part 40, not only is it possible to achieve the same operational effects as those of the first embodiment, but it also becomes possible to provide the fourth bent part 43, thus increasing the degree of freedom in design of the shape of the front side frame 31.

A ninth embodiment of the present invention is explained by reference to FIG. 12 to FIG. 15.

[Ninth Embodiment]

Figure 12:
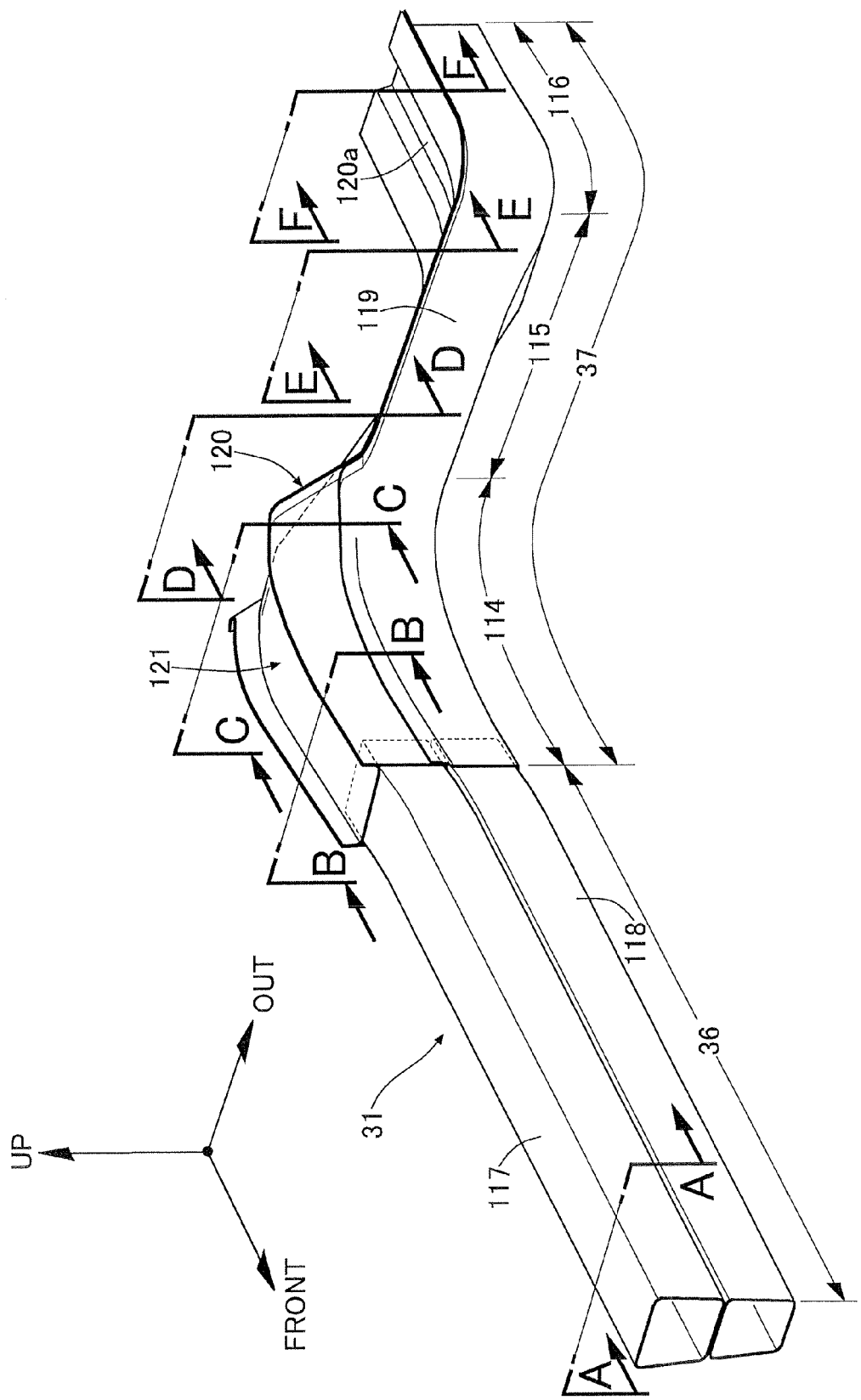
FIG. 12 is a perspective view of a front side frame. (ninth embodiment)

As shown in FIG. 12 and FIG. 13, left and right front side frames 31 disposed in the fore-and-aft direction in a vehicle body front part of an automobile are formed by integrally linking a front-side power unit mounting part 36 and a rear-side kick-up part 37. The power unit mounting part 36 is a member having a substantially linear shape, is disposed substantially horizontally when viewed from the side, and is disposed parallel to the vehicle body center line when viewed from above. The kick-up part 37 is a member bending in a substantially S-shape when viewed from the side and when viewed from above, and includes in sequence from the front to the rear a front-side bent part 114, an intermediate part 115, and a rear-side bent part 116. The front-side bent part 114, which is connected to the rear end of the power unit mounting part 36, bends, in going toward the rear, downward and inward in the left-and-right direction (vehicle width direction). The intermediate part 115, which is connected to the rear end of the front-side bent part 114, is disposed so that its rear side is inclined downward and inward in the left-and-right direction (vehicle width direction). The rear-side bent part 116, which is connected to the rear end of the intermediate part 115, bends, in going toward the rear, upward and outward in the left-and-right direction (vehicle width direction) and is disposed substantially horizontally when viewed from the side and in parallel to the vehicle body center line when viewed from above.

The power unit mounting part 36 of the front side frame 31 is formed by superimposing in the vertical direction and welding a first tubular hollow member 117 and a second tubular hollow member 118, which are formed by roll-forming a steel sheet so as to have a polygonal (trapezoidal shape with upper base down) closed cross-section. Furthermore, the kick-up part 37 of the front side frame 31 is formed by welding together first to third sheet metal members 119, 120, and 121 press-formed from a steel sheet so as to have a closed cross-section.

FIG. 14 shows the cross-sectional shape of the front side frame 31 at six positions A to F; position A corresponds to the power unit mounting part 36, position B corresponds to a front part of the front-side bent part 114 of the kick-up part 37, position C corresponds to a rear part of the front-side bent part 114 of the kick-up part 37, position D corresponds to a front part of the intermediate part 115 of the kick-up part 37, position E corresponds to a rear part of the intermediate part 115 of the kick-up part 37, and position F corresponds to the rear-side bent part 116 of the kick-up part 37.

The cross section of the power unit mounting part 36 corresponding to position A is a downwardly tapered trapezoidal cross-section overall, in which the first tubular hollow member 117, which has a downwardly tapered trapezoidal cross-section, is superimposed on the second tubular hollow member 118, which has a downwardly tapered trapezoidal cross-section. The aspect ratio λ of the cross section at position A, that is, (height b)/(left-and-right direction width a), is greater than 1, and the cross section is long in the vertical direction. Since the first and second tubular hollow members 117 and 118 each have four ridge lines, the strength is enhanced by these ridge lines.

The cross section of the front part of the front-side bent part 114 of the kick-up part 37 corresponding to position B is a downwardly tapered trapezoidal cross-section overall, similar to that of position A, and is formed by welding a base part of the second sheet metal member 120 having an upwardly opening groove-shaped cross-section to an opening part of the first sheet metal member 119 having an upwardly opening groove-shaped cross-section and by further welding the plate-shaped third sheet metal member 121 to an opening part of the second sheet metal member 120. As shown by the chain line on the cross section of position B, the rear end of the power unit mounting part 36 is inserted into the front end of the kick-up part 37 and integrally joined by welding. In this process, since the eight ridge lines of the first and second tubular hollow members 117 and 118 are connected in series to the six ridge lines of the first to third sheet metal members 119 to 121, it is possible to smoothly transmit load from the power unit mounting part 36 to the kick-up part 37, thereby enhancing the strength of the front side frame 31.

The cross section of the rear part of the front-side bent part 114 of the kick-up part 37 corresponding to position C is basically the same as the cross section of position B described above, but the aspect ratio λ is smaller due to a decrease in the height.

The cross section of the front part of the intermediate part 115 corresponding to position D is changed into a laterally long cross-sectional shape having an aspect ratio λ of less than 1 and is formed by welding the flat-shaped second sheet metal member 120 to an opening part of the first sheet metal member 119, which has an upwardly opening groove-shaped cross-section with its width increasing in the left-and-right direction, and by further welding the hat-shaped third sheet metal member 121 to an upper face of the second sheet metal member 120.

The cross section of the rear part of the intermediate part 115 corresponding to position E is one formed by eliminating the third sheet metal member 121 from the cross section of position D, and is a laterally long cross-sectional shape with an aspect ratio λ that is further decreased.

The cross section of the rear-side bent part 116 corresponding to position F has an increased height for the first sheet metal member 119 compared with the cross section of position E and the aspect ratio λ is slightly increased. Furthermore, a downwardly recessed bead 120a is formed in a central part in the width direction of the second sheet metal member 120.

As is clear from FIG. 13 and FIG. 14, the axial force, the lateral bending moment, and the vertical bending moment to which the front side frame 31 is subjected when the automobile is involved in a frontal collision change along the longitudinal direction.

That is, the axial force is high over the entire region of the power unit mounting part 36 (position A) and the front part of the front-side bent part 114 of the kick-up part 37 (position B), decreases to a medium level in the rear part of the front-side bent part 114 (position C) and the front part of the intermediate part 115 (position D), and is low in the rear part of the intermediate part 115 (position E) and the rear-side bent part 116 (position F).

The absolute value of the lateral bending moment changes from a low state to a high state over the entire region of the power unit mounting part 36 (position A), attains a medium level in the front part of the front-side bent part 114 (position B) and the rear part of the front-side bent part 114 (position C), is high in the front part of the intermediate part 115 (position D), attains a medium level in the rear part of the intermediate part 115 (position E), and is low in the rear-side bent part 116 (position F).

The absolute value of the vertical bending moment changes from a low state to a high state over the entire region of the power unit mounting part 36 (position A), is high in the front part of the front-side bent part 114 (position B), attains a medium level in the rear part of the front-side bent part 114 (position C), is low in the front part of the intermediate part 115 (position D) and the rear part of the intermediate part 115 (position E), and is high in the rear-side bent part 116 (position F).

In the graph of FIG. 13, the lateral bending moment and the vertical bending moment show that the bending direction reverses above and below the abscissa (moment=0).

The cross-sectional shape of each part of the front side frame 31 is set according to change in axial force, lateral bending moment, and vertical bending moment as described above. Specifically, the power unit mounting part 36 (position A) can cope with a high axial force by means of the first tubular hollow member 117 and second tubular hollow member 118 each having four, that is, a total of eight ridge lines. Furthermore, the front part of the front-side bent part 114 of the kick-up part 37 (position B) can cope with a high axial force by means of a total of six ridge lines of the first to third sheet metal members 119 to 121 and a total of four flange-joined sections of the first to third sheet metal members 119 to 121. Furthermore, in the rear part of the front-side bent part 114 (position C), the weight is reduced by decreasing the height of the cross section in response to a decrease in the vertical bending moment.

Moreover, in the front part of the intermediate part 115 (position D), the lateral width of the cross section is increased in response to an increase in the lateral bending moment, and the height of the cross section is decreased in response to a decrease in the vertical bending moment, thus decreasing the aspect ratio λ. Furthermore, since in the rear part of the intermediate part 115 (position E) both the axial force and the moment decrease, the third sheet metal member 121 is eliminated, thus reducing the weight. Moreover, in the rear-side bent part 116 (position F), since the vertical bending moment increases, the height of the cross section is increased, and the bead 120a is provided on the second sheet metal member 120, which is the compression side.

FIG. 15 is a graph showing change in the input/yield strength ratio of the front side frame 31 in the longitudinal direction. The solid line shows a case in which the entire front side frame 31 is formed from a tubular hollow member, and the broken line shows a case in which the entire front side frame 31 is formed from a sheet metal member.

The input is the collision load to which the front side frame 31 is subjected when the automobile is involved in a frontal collision, and the yield strength is the load that the front side frame 31 can withstand without bending. When the input/yield strength exceeds 100%, the front side frame 31 bends at that position to thus absorb collision energy, and in this embodiment the front side frame 31 is set so as to bend at three positions denoted by a, b and c.

At positions other than the three positions a, b, and c where the front side frame 31 is bent, suppressing the input/yield strength to about 80% prevents the front side frame 31 from being bent with a margin of 20%. In this process, if the input/yield strength decreases greatly from 80%, the front side frame 31 has excessive strength and the weight increases unnecessarily, and the input/yield strength is therefore preferably at a position slightly lower than 80%.

However, it can be seen that when the entire front side frame 31 is formed from a tubular hollow member (solid line), the strength becomes excessive at position d and position e of the kick-up part 37, the input/yield strength becomes much lower than 80%, and the weight increases unnecessarily. On the other hand, if the entire front side frame 31 is formed from a sheet metal member (broken line), the strength becomes insufficient at position f of the rear end of the power unit mounting part 36, the input/yield strength greatly exceeds 80%, and there is a possibility that the front side frame 31 will bend at position f.

In the present embodiment, since the power unit mounting part 36 of the front side frame 31 is formed from a tubular hollow member, and the kick-up part 37 of the front side frame 31 is formed from a sheet metal member, it is possible, while ensuring a distribution of the strength for bending the front side frame 31 at three positions a, b, and c to prevent the strength of other portions of the front side frame 31 from becoming excessive, thus maximizing the reduction in weight.

As described above, in the power unit mounting part 36 and the kick-up part 37 of the front side frame 31, since the characteristics of the change in the axial force and the moment acting thereon are different, the power unit mounting part 36, which is subjected to a large axial force, is formed by the first tubular hollow member 117 and the second tubular hollow member 118 having a large number of ridge lines to thus ensure a necessary strength, and the kick-up part 37, for which the change in moment is large, is formed by combining the first to third sheet metal members 119 to 121 to thus realize a fine-tuned strength distribution, thereby preventing the strength from becoming excessive and reducing the weight of the front side frame 31.

Figure 16:
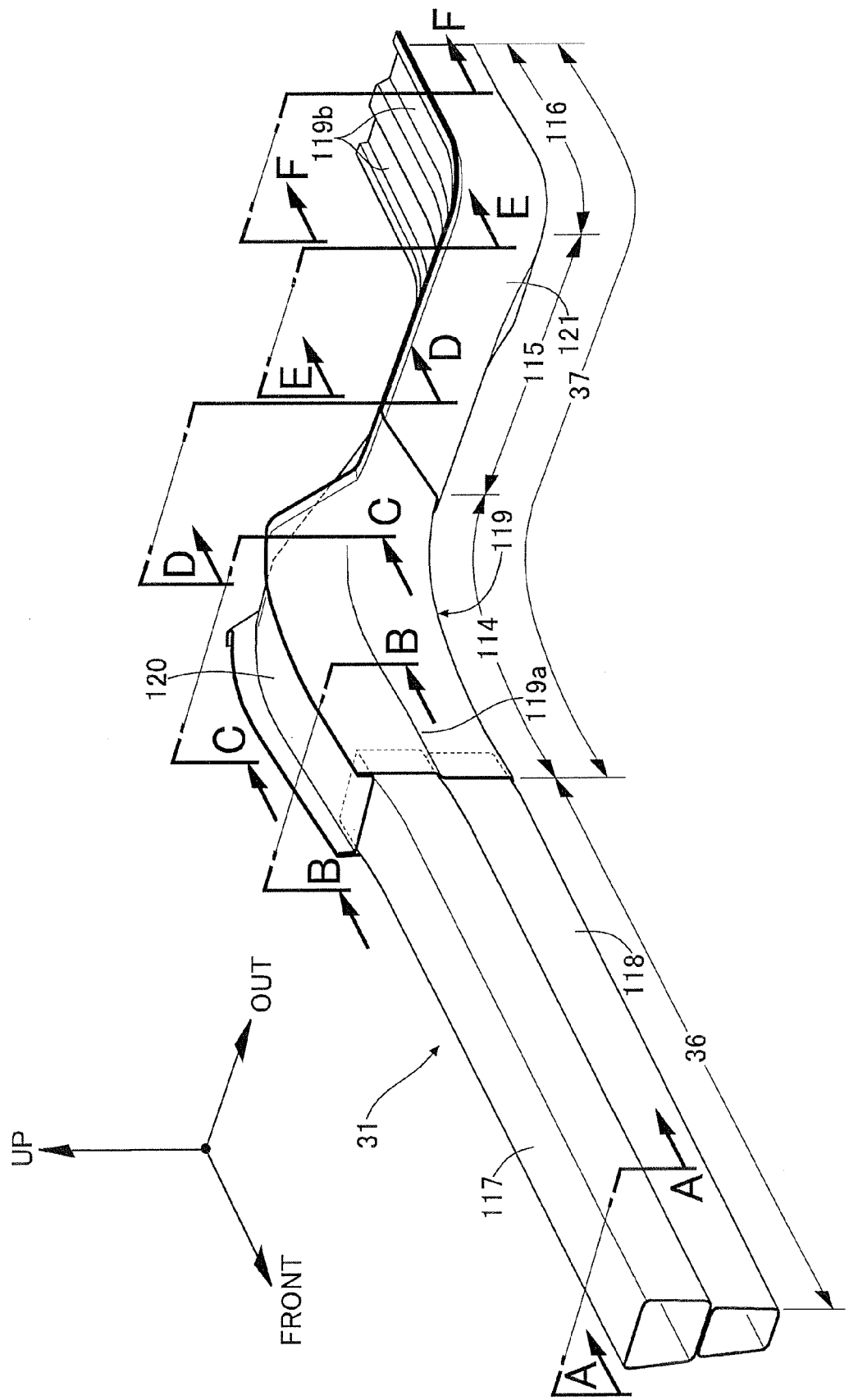
FIG. 16 is a perspective view of a front side frame. (tenth embodiment)

A tenth embodiment of the present invention is explained by reference to FIG. 16 and FIG. 17.

[Tenth Embodiment]

The structure of a front side frame 31 of the tenth embodiment is basically the same as that of the front side frame 31 of the ninth embodiment and is formed from a power unit mounting part 36 extending in a linear shape on the front side and a kick-up part 37 bending into an S-shape on the rear side. Although the kick-up part 37 of the front side frame of the ninth embodiment is formed from the first to third sheet metal members 119 to 121, which have the same sheet thickness, the kick-up part 37 of the front side frame 31 of the tenth embodiment is formed from first to third sheet metal members 119 to 121 having different sheet thicknesses, and the sheet thickness of the first sheet metal member 119 is set larger than the sheet thickness of the second sheet metal member 120 and the third sheet metal member 121, which is a point of difference.

The cross section at position A of the power unit mounting part 36 is formed by welding together a first tubular hollow member 117 and a second tubular hollow member 118 in the vertical direction; the lateral width of a lower face of the first tubular hollow member 117 is larger than the lateral width of an upper face of the second tubular hollow member 118, and there is a step formed in the joined section.

The cross sections at position B and position C of the kick-up part 37 are formed by welding the flat-shaped second sheet metal member 120 to an opening part of the first sheet metal member 119 having an upwardly opening groove-shaped cross-section with steps 119a and 119a. The aspect ratio λ is larger than 1 for both, and the cross-sectional shape is long in the vertical direction.

The cross section at position D of the kick-up part 37 is formed by welding the first sheet metal member 119 and the second sheet metal member 120 in a similar way, but the height of the first sheet metal member 119 rapidly decreases, the steps 119a and 119a disappear, and the second sheet metal member 120 is changed into a hat shape. The aspect ratio λ is less than 1, and the cross-sectional shape is changed so that it is long in the lateral direction.

The cross section at position E of the kick-up part 37 is formed by superimposing the first sheet metal member 119 having further reduced height on the interior of the third sheet metal member 121 having an upwardly opening groove-shaped cross-section and by welding a flat rear part of the second sheet metal member 120 to opening parts of the first and third sheet metal members 119 and 121. The aspect ratio λ is a minimum at this position.

The cross section at position F of the kick-up part 37 is formed by welding the first sheet metal member 119, which changes from the groove-shaped cross-section into a flat shape, to the opening part of the third sheet metal member 121 having an upwardly opening groove-shaped cross-section, and the first sheet metal member 119 is provided with two beads 119b and 119b extending in the fore-and-aft direction. The aspect ratio λ starts to increase but is still less than 1.

The reason why these cross-sectional shapes are selected is basically the same as for that in the ninth embodiment (see FIG. 14), but points of difference are explained.

At position B, in the ninth embodiment the first to third sheet metal members 119 to 121 include a total of six ridge lines, whereas since in the tenth embodiment the first and second sheet metal members 119 and 120 include only a total of four ridge lines, this is taken into account by forming the steps 119a and 119a on a side face of the first sheet metal member 119 to thus enhance the rigidity, thereby imparting resistance to a high axial force. Moreover, in order to impart resistance to a large downward bending moment, the first sheet metal member 119 on the compression side is formed from a thick sheet.

At position F, in order to impart resistance to a large upward bending moment, the third sheet metal member 119 on the compression side is formed from a thick sheet and the two beads 119b and 119b are formed.

In accordance with this tenth embodiment, the same operational effects as those of the ninth embodiment described above can be achieved.

Embodiments of the present invention are explained above, but the present invention may be modified in a variety of ways as long as the modifications do not depart from the spirit and scope thereof.

For example, in the embodiments the first weak part 41 and the second weak part 42 are formed by the annealing treatment but they may be formed by means of an opening part, a cutout, a bent bead, etc.

Furthermore, the cross-sectional shape of the first and second tubular hollow members 117 and 118 is not limited to a trapezoidal shape and may be a closed cross-sectional shape such as a polygon including a rectangle and a square or a shape other than a polygon.

Moreover, the number of sheet metal members forming the kick-up part 37 is not limited to three as in the embodiments and may be any as long as there is a plurality.

The invention claimed is:

1. A structure for front side frames of an automobile in which a front side frame disposed in a fore-and-aft direction in a front part of a vehicle body is formed from a tubular hollow member, and the front side frame comprises a front-side first bent part and a rear-side second bent part at the rear of a power unit mounting part for a power unit to be mounted thereon, wherein the front side frame comprises a third bent part that bends convexly outward in a vehicle width direction in front of the power unit mounting part, a first weak part that is weaker than other portions of the front side frame is formed in the vicinity of the second bent part, and a second weak part that is weaker than other portions of the front side frame is formed in the vicinity of the third bent part, and wherein the power unit mounting part is formed by vertically superimposing two tubular hollow members.

2. The structure for front side frames of an automobile according to claim 1, wherein the front-side first bent part and the rear-side second bent part cooperate to form a kick-up part configured to have a closed cross-section.

3. The structure for front side frames of an automobile according to claim 2, wherein each of the tubular hollow members of the power unit mounting part has a polygonal cross-section.

4. The structure for front side frames of an automobile according to claim 3, wherein the tubular hollow members have ridge lines connected to ridge lines of adjacent sheet metal members.

5. The structure for front side frames of an automobile according to claim 2, wherein the kick-up part is bent into an S-shape, and an intermediate part interposed between the first and second bent parts has an aspect ratio ($\lambda$) of less than 1.

6. The structure for front side frames of an automobile according to claim 3, wherein the kick-up part is bent into an S-shape, and an intermediate part interposed between the first and second bent parts has an aspect ratio ($\lambda$) of less than 1.

7. The structure for front side frames of an automobile according to claim 4, wherein the kick-up part is bent into an S-shape, and an intermediate part interposed between the first and second bent parts has an aspect ratio ($\lambda$) of less than 1.

* * * * *